United States Patent [19]

Kato et al.

[11] Patent Number: 4,502,591
[45] Date of Patent: Mar. 5, 1985

[54] TRANSFER MECHANISM

[75] Inventors: Hisanori Kato; Tomio Takagi, both of Niihama, Japan

[73] Assignee: Sumitomo Heavy Industries, Ltd., Tokyo, Japan

[21] Appl. No.: 335,408

[22] Filed: Dec. 29, 1981

[51] Int. Cl.³ .............................................. B65G 25/00
[52] U.S. Cl. ..................................... 198/621; 198/774
[58] Field of Search ............... 198/621, 740, 855, 858, 198/859, 774; 414/751

[56] References Cited

U.S. PATENT DOCUMENTS

| | | | |
|---|---|---|---|
| 3,655,070 | 4/1972 | Haydu | 198/621 |
| 4,168,611 | 9/1979 | Woyton et al. | 198/855 |
| 4,236,626 | 12/1980 | Noe | 198/744 |
| 4,462,521 | 7/1984 | Takagi | 198/621 |

FOREIGN PATENT DOCUMENTS 45-34758 11/1970 Japan .

Primary Examiner—Joseph E. Valenza
Assistant Examiner—Kyle E. Shane
Attorney, Agent, or Firm—Armstrong, Nikaido, Marmelstein & Kubovcik

[57] ABSTRACT

A transfer mechanism for transferring articles one by one from one position to another position, particularly for use with a forging press having a plurality of molds arranged in series to successively transfer blanks from a receiving position to the mold of the first step and then to the mold of the second step and so on. The transfer mechanism comprising a pair of parallel feed bars provided on their opposing surfaces with plural pairs of clamping jaws and three separate sets of hydraulic cylinders for moving the feed bars in three orthogonal directions, respectively, and cam-operated hydraulic pumps operated with cams mounted in different phases on a drive shaft rotated in timed relation with the forging press, each cam-operated hydraulic pump being hydraulically connected to each hydraulic cylinder so that the feed bars effect cyclic movement to clamp, lift up, carry ahead, lift down, and unclamp blanks and to return to an original position.

13 Claims, 11 Drawing Figures

TRANSFER MECHANISM

BACKGROUND OF THE INVENTION

The present invention relates to a transfer mechanism for successively transferring articles in one direction and, more particularly, to a transfer mechanism suitable for use in articles in a machine having a plurality of molds arranged in series, the articles or blanks from a receiving position to the mold of the first step and then to a mold of a second step.

A typical known transfer mechanism conventionally used for this purpose includes a pair of substantially parallel feed bars, a plurality of clamping jaws provided on the opposing surfaces of the feed bars, means for supporting the bars for movement in three orthogonal directions, and three independent drives operable in timed relation to effect cyclic movement of the bars in the three directions successively. In operation, two feed bars are moved toward each other to each pair of opposing clamping jaws clamp therebetween one blank. The bars are then moved upwardly so that the plurality of blanks clamped between pairs of clamping jaws are lifted simultaneously. Then, the bars are moved ahead by a predetermined distance and, after being lowered to a predetermined level, are moved away from each other to release all the blanks. The bars are finally moved back to resume the initial position.

In this conventional transfer mechanism, each drive comprise a drive shaft device including a shaft driven by the driving power source of the press or by an independent electric motor and a plurality of cams and gears mounted on the shaft, a plurality of levers, links and transmission shafts adapted to operate following up the motion of the drive shaft device, and a plurality of pneumatic cylinders adatped for bringing the levers into engagement with the cams.

In this conventional mechanism, the feed bars are operated at speeds determined by the contours of cams. It is, therefore, possible to obtain a very smooth movement of the feed bars without suffering any substantial impact and vibration. In consequence, various transfer failures such as incorrect clamping of the blank by the jaws, dropping of the same during forward movement and so forth are avoided.

This conventional mechanism, however, has the following drawbacks. Firstly, since the levers, links and other sliding members adapted to be operated by the cams are required to have sufficiently high rigidity, the weights of these parts is increased to impose a practical limit in increasing the speed of operation of the transfer mechanism. Secondly, it is to be pointed out that this conventional mechanism of a pure mechanical driving type has an impractically complicated construction, requiring much labor and time in maintenance and resulting in a high cost of production.

In order to obviate the above-explained drawbacks of the mechanical drive, it has been proposed by the inventors herein to actuate the feed bars hydraulically. In such hydraulic drive systems, however, the supply and discharge of the hydraulic oil to and from the hydraulic cylinders for driving the feed bars are controlled by means of a selector valve adapted to switch the direction of flow of the oil coming from a hydraulic pump. Therefoere, the movement of the feed bars in each direction is made at a constant speed from the start to the finish of each motion and the motions are performed in a discontinous manner by the switching of valves in accordance with limit signals. Impacts and vibrations thus inevitably take place in the operation of the transfer mechanism. To avoid the generation of impacts and vibrations, it is necessary to delicately control the opening of the valves during a very short period of time. Such control, however, is quite difficult to achieve from a technical point of view and requires a highly complicated and expensive control device solely for this purpose.

SUMMARY OF THE INVENTION

Accordingly, an object of the invention is to provide an improved transfer mechanism capable of obviating the above-described problems of the prior art.

To this end, according to the invention, there is provided a transfer mechanism in which the movement of feed bars in each direction is effected by an independent hydraulic cylinder which is adapted to be supplied with the working fluid from a cam-operated hydraulic pump. The cams for operating the hydraulic pumps are mounted on a common drive shaft at predetermined phase differences so that the hydraulic cylinders for driving the feed bars are activated successively in a predetermined sequence at speeds varied in accordance with the cam contours, as the drive shaft is rotated by a suitable power source.

According to the invention, it is thus possible to effect the desired speed control of the feed bars in each action, thereby to ensure a smooth and safe transfer of the successive pieces of blank. In addition, the mechanism as a whole can have a simplified construction with reduced weight, which in turn affords various advantages such as higher speed of operation, reduced cost of production and easier maintenance.

The invention will be more fully understood from the following description of the preferred embodiments taken in conjunction with the accompanying drawings.

DESCRIPTION OF THE PREFERRED EMBODIMENTS

Figure 1:
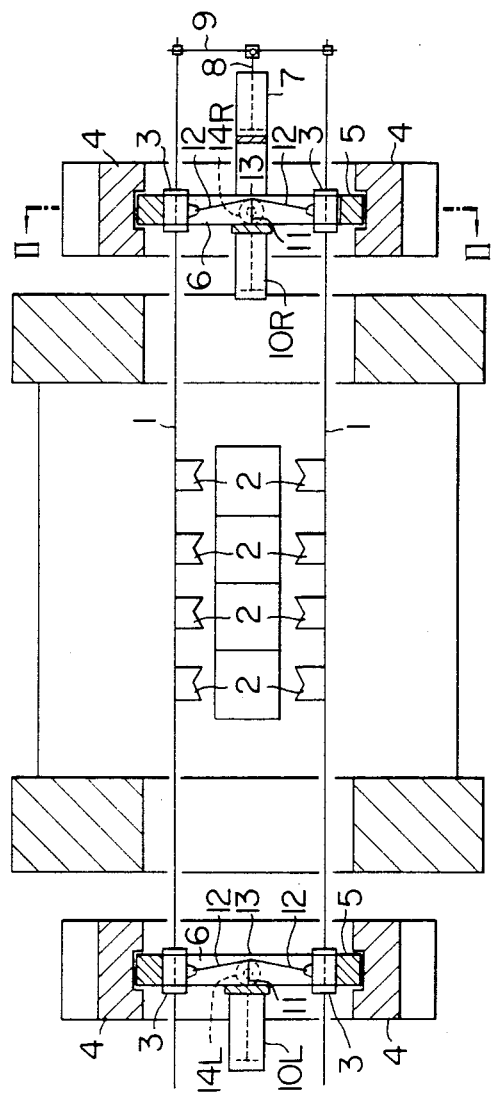
FIG. 1 is a schematic horizontal sectional view of a transfer mechanism in accordance with the invention.

Referring to FIGS. 1 thru 4 showing a first embodiment of the invention, a pair of feed bars 1 are provided on their opposing surfaces with pairs of opposing clamping jaws 2, 2 and supported at their ends to be slidable within respective supports 3. Lift frames 5 are guided by a frame 4 for vertical movement. Holes 6 formed in the lift frames 5 are adapted to support the feed bar supports 3 for movement in the horizontal direction, i.e. in the direction perpendicular to the feed bars 1. An advance cylinder 7 is fixed to the lift frame 5 and adapted to drive the feed bar 1 forward or backward. The cylinder 7 has a piston rod 8 which is connected to a cross bar 9 engaging with the feed bars 1. Clamp cylinders 10 and 10L are fixed to the lift frame 5 and adapted to drive the feed bars 1 to and from each other thereby to make the jaws 2,2 on the feed bars 1 clamp or release the blanks. Each clamp cylinder has a piston rod 11 which is connected by means of a pin 13 to one ends of links 12 of an equal length, the links 12 being pivotally connected at their other ends to the feed bar supports 3. The vertical movement of the lift frames 5 are caused by lift cylinders 14R, 14L.

Figure 4:
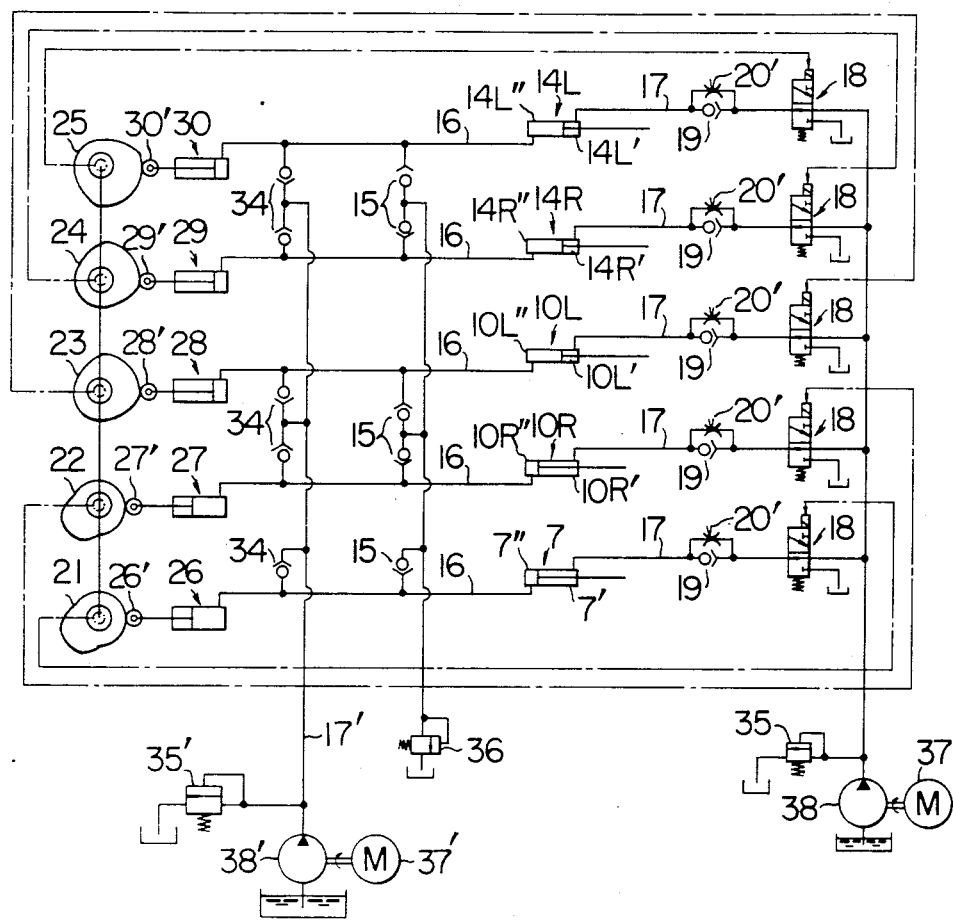
FIG. 4 is a circuit diagram of an example of a hydraulic system incorporated in the transfer mechanism of the invention.

An explanation will be made hereinunder with reference to FIG. 4 as to the hydraulic circuit for sequentially operating the advance cylinder 7, clamp cylinders 10R and 10L and the lift cylinders 14R and 14L.

Each of these cylinders is a double-acting cylinder having a backward chamber 7', 10R', 10L', 14R', 14L' which is connected, through a line 17 having a non-return valve 19 and a solenoid-actuated selector valve 18, to a hydraulic pump 38 adapted to be driven by a motor 37. The line 17 also has a restrictor valve 20' connected in parallel with the non-return valve 19. The forward chambers 7", 10R", 10L", 14R", 14L" of respective double-acting hydraulic cylinders are connected through lines 16 to hydraulic cam pumps 26, 27, 28, 29, 30 adapted to be operated by rotary cams 21, 22, 23, 24, 25. The lines 16 are connected to a relief valve 36 through respective non-return valves 15 and also to a hydraulic pump 38' driven by a motor 37', via a line 17' through respective non-return valves 34. The delivery pressure of the hydraulic pump 38 is maintained at a comparatively high level by the action of a relief valve 35, while the relief valve 35' functions to maintain the delivery pressure of the hydraulic pump 38' at a comparatively low level.

Figure 3:
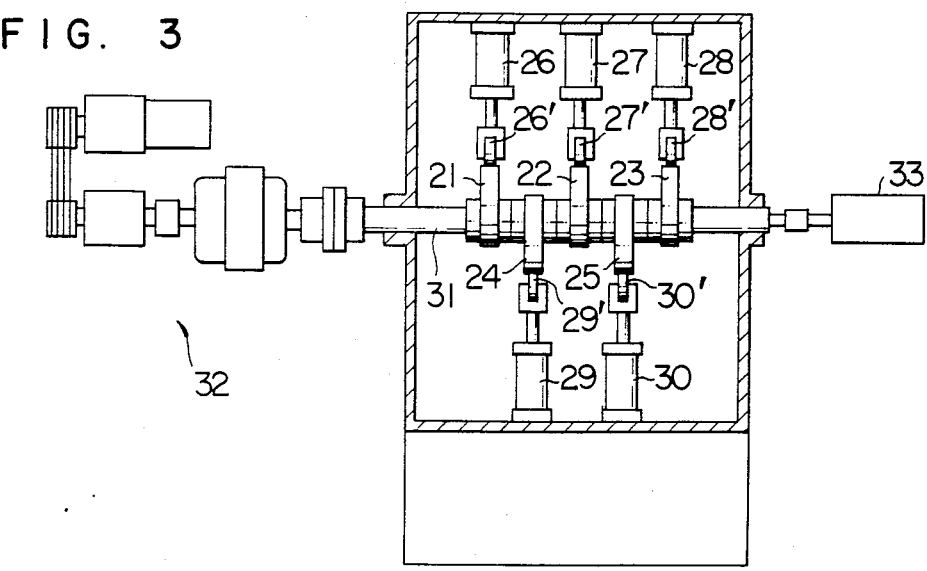
FIG. 3 is a schematic illustration of cam-operated hydraulic pumps and a driving system for driving the pumps.

As will be clearly seen from FIG. 3, the rotary cans 21, 22, 24 are mounted on the cam shaft 31 at predetermined phase differences, while the rotary cams 23 and 25 are attached to the same cam shaft 31 at the same phases, i.e. same angular positions, as the rotary cams 22, 24, respectively.

In FIG. 3, a driving power source 32 rotatively driving the cam shaft 31. However, the power source 32 may be dispensed with if the cam shaft 31 is rotatively driven by the driving power source of the press.

Rotary switches 33 are connected directly to the cam shaft 31 at the same phases as respective rotary cams. As one of these switches is turned on, the corresponding one of the solenoid-actuated selector valves 18 is energized to permit the working fluid to be relieved from the backward chambers 7', 10R', 10L', 14R', 14L' back to a tank. To the contrary, when the rotary switch 33 is turned off, the selector valve 18 is operated to permit the working oil delivered by the hydraulic pump 38 to be supplied into the backward chamber of the associated cylinder.

In the transfer mechanism of this embodiment, the feed bars are operated in accordance with a predetermined sequence as explained below.

First of all, electric motors 37, 37' are started to drive the hydraulic pumps 38, 38'. The pressurized fluid or oil delivered by the hydraulic pump 38 is delivered through the solenoid-actuated selector valves 18 and the non-return valves 19 to the backward chambers 7', 10R', 10L', 14R', 14L' of the cylinders to make these cylinders retract their piston rods. Meanwhile, the working oil in the forward chambers 7", 10R", 10L", 14R", 14L" is forced back into the cylinders of the cam-operated hydraulic pumps 26, 27, 28, 29, 30 so that the piston rod ends 26', 27', 28', 29', 30' of the pumps are pressed against the surfaces of the cams 21, 22, 23, 24, 25.

Then, the cam shaft 31 is rotated in synchronism with the driving source of the press, so that the cams 21, 22, 23, 24, 25 are rotated. In consequence, the cam-operated hydraulic pump 26 starts to operate by the engagement between its piston rod end 26' and the peripheral surface of the cam 21. At the same time, the rotary switch 33 is activated so that the selector valve 18 is switched to permit the working oil to be relieved from the backward chamber 7' of the advance cylinder 7. Then the pressurized oil is delivered from the cam pump 26 to the forward chamber 7" of the advance cylinder 7 and as the pressure in the forward chamber 7" is increased to overcome the pressure in the backward chamber 7', the advance cylinder 7 operates at a speed varying in accordance with the rotation speed of the cam 21 and the contour of the same, thereby to move the feed bars 1 ahead. Meanwhile, the working oil in the backward chamber 7' is discharged into the tank through the restrictor valve 20' and the selector valve 18. Any overstroke attributable to the inertia of the feed bars and other movable parts is prevented by the action of the restrictor valve 20'.

A further rotation of the cam 21 brings the valley portion thereof into operative position and, at the same time, the rotary switch 33 is turned off to reset the selector valve 18, so that the pressurized oil delivered by the hydraulic pump 38 is introduced into the backward chamber 7' of the advance cylinder so that the latter retracts its piston rod thereby to pull the feed bars 1 backward.

Then, the clamp cylinders 10R, 10L and the lift cylinders 14R, 14L are operated sequentially by the rotation of the cams 22, 23 and 24, 25 which are mounted on the cam shaft 31 to operate at predetermined time lags to the operation of the cam 21, and the operation of the rotary switches directly fixed to the cam shaft 31. Namely, by the operation of these cams and the signals derived from the rotary switches, the cam-operated hydraulic pumps 27, 28 and 29, 30 perform their strokes successively so as to drive the clamp cylinders 10R, 10L and the lift cylinders 14R, 14L in the same manner as the operation of the advance cylinder 7, thereby to effect the clamping and unclamping operation and the up and downward motion of the feed bars 1, respectively.

Figure 5:
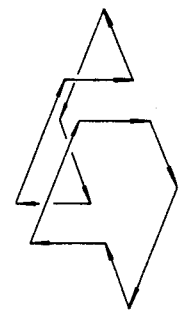
FIG. 5 is an illustration of the loci or paths of movement of feed bars driven by the drive mechanism of the invention.
Figure 2:
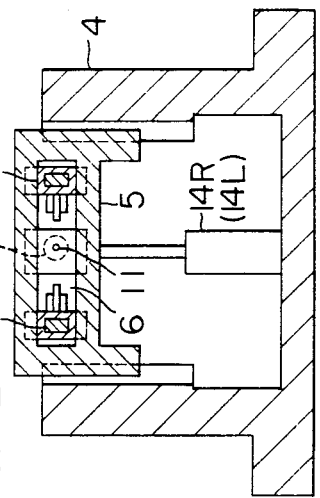
FIG. 2 is a sectional side elevational view of the transfer mechanism taken along the line II—II of FIG. 1.

The feed bars 1 therefore make three dimensional movement consisting of clamping, lifting, advancing, lowering, unclamping, and returning, so that the clamping jaws of the feed bars are moved along the paths as illustrated in FIG. 5, thereby to successively transfer the pieces of blank.

When there is a shortage of the working oil in the cam-operated pump due to a leak or the like, the oil of the low pressure from the hydraulic pump 38' is charged into the cam-operated pump during the backward stroke of the latter to make up for the shortage of the oil.

Figure 6:
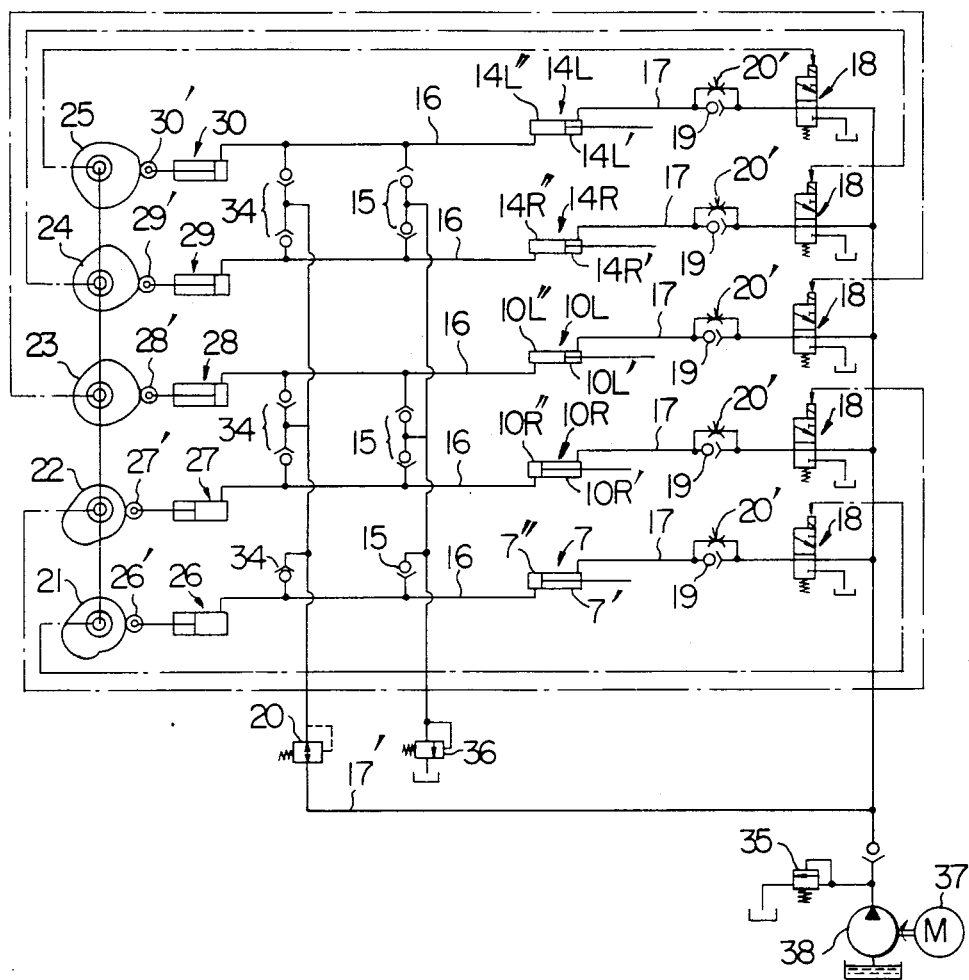
FIG. 6 is a circuit diagram of a modification of the hydraulic system shown in FIG. 4.

In order to make up for the stortage of the working oil in the cam-operated pump, the oil from the high pressure hydraulic pump 38 may be charged into the cam-operated pump during the backward stroke of the latter. FIG. 6 shows a hydraulic circuit partially modified from the hydraulic circuit as shown in FIG. 4 for this purpose. In this modified circuit the make-up line 17' is connected to the high pressure hydraulic pump 38 instead of the low pressure hydraulic pump 38' and provided with a pressure reduction valve 20 for controlling the pressure of the make-up oil to be supplied to the cam-operated pumb 26, 27, 28, 29 or 30 to a low level. The hydraulic circuit in FIG. 6 is advantageous more than the hydraulic circuit in FIG. 4, since the costs of the motor 37, the hydraulic pump 38' and the relief valve 35' can be economized, but is somewhat disadvantageous in that the pressure reduction, valve has a tendency of clogging.

As has been described, according to the invention, a plurality of cam-operated hydraulic pumps are operated sequentially by means of groups of cams mounted on a common cam shaft at predetermined phase differences, and hydraulic cylinders for driving the feed bars are activated sequentially by the oil delivered from the cam-operated pumps. Therefore, the feed bars are operated quite smoothly at speeds corresponding to the contours of the cams, so that the pieces of the blank are successively transferred without fail by the clamping jaws mounted on the feed bars. In addition, the reduced weights of the movable parts permit a higher speed operation of the transfer mechanism, and the construction of the transfer mechanism as a whole is remarkably simplified as compared with the conventional mechanisms to facilitate the maintenance work.

In the event that the piston of the hydraulic cylinder accidentally fails to perform the designated stroke during forward operation for driving the feed bar, the oil pressure in the line connected to the forward chamber of such cylinder is increased abnormally. Such an abnormal rise of the oil pressure, however, is safely relieved by the relief valve 36 so that the breakage of the line is avoided. Even when there is a shortage of oil in the cam-operated hydraulic pump due to the relief of the oil or leak of the same, the oil of low pressure is automatically charged into the cam-operated pump thereby to make up for the shortage of the oil, so that the hydraulic cylinder is driven correctly and rapidly, without any change of the stroke.

The hydraulic circuit incorporated in the transfer mechanism stated hereinbefore is not exclusive, and various hydraulic circuits other than stated above can be used in the transfer mechanism of the invention.

Figure 7:
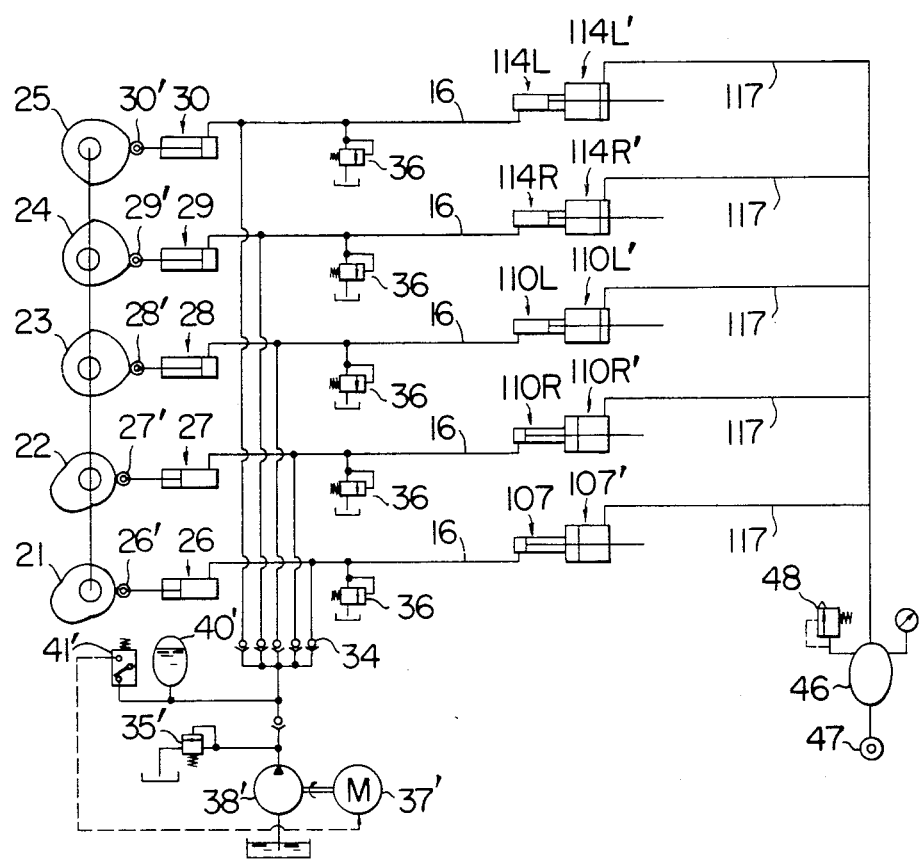
FIG. 7 is a circuit diagram of a second example of the hydraulic system.

FIG. 7 shows a second example of the hydraulic circuit in which single-acting cylinders are used as the cylinders for driving the feed bars, while the backward movement of the feed bars is achieved by a pneumatic cylinder connected to each single-acting hydraulic cylinder in a tandem manner.

Figure 8:
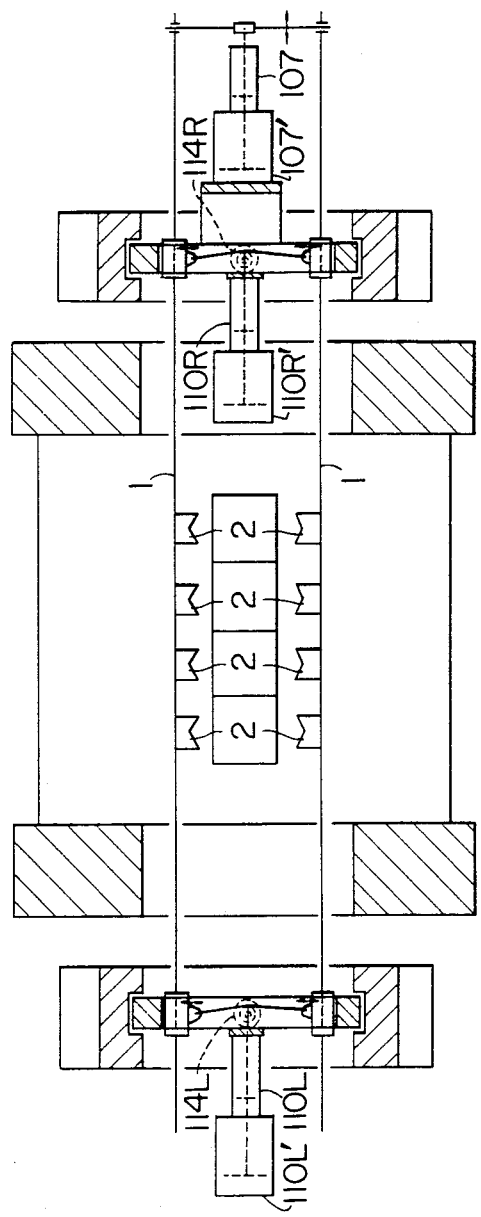
FIG. 8 is a schematic horizontal sectional view of a transfer mechanism of the invention, incorporating integrated hydraulic and pneumatic cylinders of the second example of hydraulic system as shown in FIG. 7.

FIG. 8 is a horizontal sectional view of the whole part of the transfer mechanism incorporating pneumatic cylinders integral with respective hydraulic cylinders. The hydraulic cylinders 107 110R, 110L, 114R, 114L are coupled to pneumatic cylinders 107', 110R', 110L', 114R', 114L' such that the pistons of the hydraulic cylinder and the associated pneumatic cylinder move as a unit with each other. The working chamber of each pneumatic cylinder is connected to an air accumulator 46 through a line 117. The air accumulator 46 is supplied with a pressurized air from an air supply source 47. A relief valve 48 is provided on the air accumulator 46. The working chambers of the single-acting hydraulic cylinders are connected, as in the case of the first example, to corresponding cam-operated hydraulic pumps 26, 27, 28, 29, 30. Any type of make-up circuit for making up for shortage of the oil explained hereinbefore may be used also in this example. In this example, however, the make-up circuit is constituted by an accumulator 40', hydraulic pump 38' for supplying the make-up oil, a pressure switch 41' for setting the pressure of the accumulator at a low level, and a solenoid valve 35' adapted for unloading the oil delivered from the hydraulic pump 38' in accordance with the turning on of the pressure switch 41' or, alternatively, an interlocking circuit adapted to stop the electric motor 37' for driving the hydraulic pump in accordance with the turning on of the same pressure switch 41'.

In operation, the working oil is supplied to the hydraulic cylinder 107, 110R, 110L, 114R or 114L in the delivery stroke of the cam-operated hydraulic pump 26, 27, 28, 29 or 30. As the hydraulic force becomes greater than the force generated by the pneumatic pressure supplied to the pneumatic cylinder 107', 110R', 110L', 114R' or 114L' from the air accumulator 46 which in turn is supplied with compressed air from the air source 47, the hydraulic cylinder commences its forward stroke to drive the feed bars 1,1 forwardly, upwardly or in the clamping direction. The speed of movement of the feed bars 1,1 precisely corresponds to the rotation speed and the contour of each cam 21, 22, 23, 24 or 25. Meanwhile, the pressurized air in each pneumatic cylinder is forcibly fed back to the air accumulator 46 to ensure a smooth and soft operation of the feed bars and other movable parts through resisting to the inertia of the feed bars and other movable parts.

Then, as the cam shaft is further rotated to bring the valley portion of each cam into contact with the associated piston rod end 26', 27', 28', 29' or 30', the oil pressure in the cam-operated hydraulic pump is decreased so that the force generated by the pneumatic pressure in the pneumatic cylinder comes to exceed the force produced by the hydraulic pressure in the single-acting hydraulic cylinder, so that the feed bars are moved backwardly.

In the event of shortage of the working oil in the hydraulic cylinder and the cam-operated hydraulic pump due to leak, the make-up oil is supplied automatically in the returning stroke of the cam-operated hydraulic pump, from the make-up circuit mentioned before. It is, therefore, possible obtain a constant displacement of the cam-operated hydraulic pump and, hence, a constant stroke of the hydraulic cylinder.

In this example, the returning stroke of the hydraulic cylinder is effected by the pneumatic cylinder combined with the hydraulic cylinder, so that the cost of the transfer mechanism as a whole can be reduced as compared with the first example in which the returning stroke is performed also by the hydraulic oil.

In this example, the hydraulic cylinder and the associated pneumatic cylinder are united with each other in a tandem manner. This, however, is not essential and an equivalent effect is obtained even when the hydraulic cylinder and the pneumatic cylinder are united in a parallel form, as will be clear to those skilled in the art.

Instead of connecting the working chamber of each pneumatic cylinder 107′, 110R′, 110L′, 114R′, 114L′ to the air accumulator 46 through the line 117, it is possible to close the working chamber of each pneumatic cylinder independently so as to confine the air therein, so that the same effect may be achieved by the compression and expansion of the confined air. An example of such a pneumatic cylinder having closed working chamber confining air is shown in FIG. 9.

Figure 10:
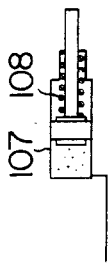
FIG. 10 is a sectional view of another modification of the hydraulic cylinder in the second example of hydraulic system as shown in FIG. 7.

This example of the hydraulic circuit is characterized by the use of single-acting cylinders as the hydraulic cylinders for driving the feed bars, and the backward stroke of the single-acting cylinders is made by the pneumatic cylinders connected to respective single-acting hydraulic cylinders. It is, however, possible to substitute springs for the pneumatic cylinders for effecting the backward stroke of the single-acting hydraulic cylinders. FIG. 10 shows an example of such one 107 of single-acting cylinders incorporating a spring. The spring is designated at a reference numeral 108.

Figure 9:
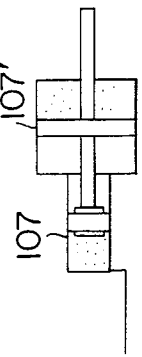
FIG. 9 is a sectional view of a modification of the hydraulic cylinder in the second example of hydraulic system as shown in FIG. 7.
Figure 11:
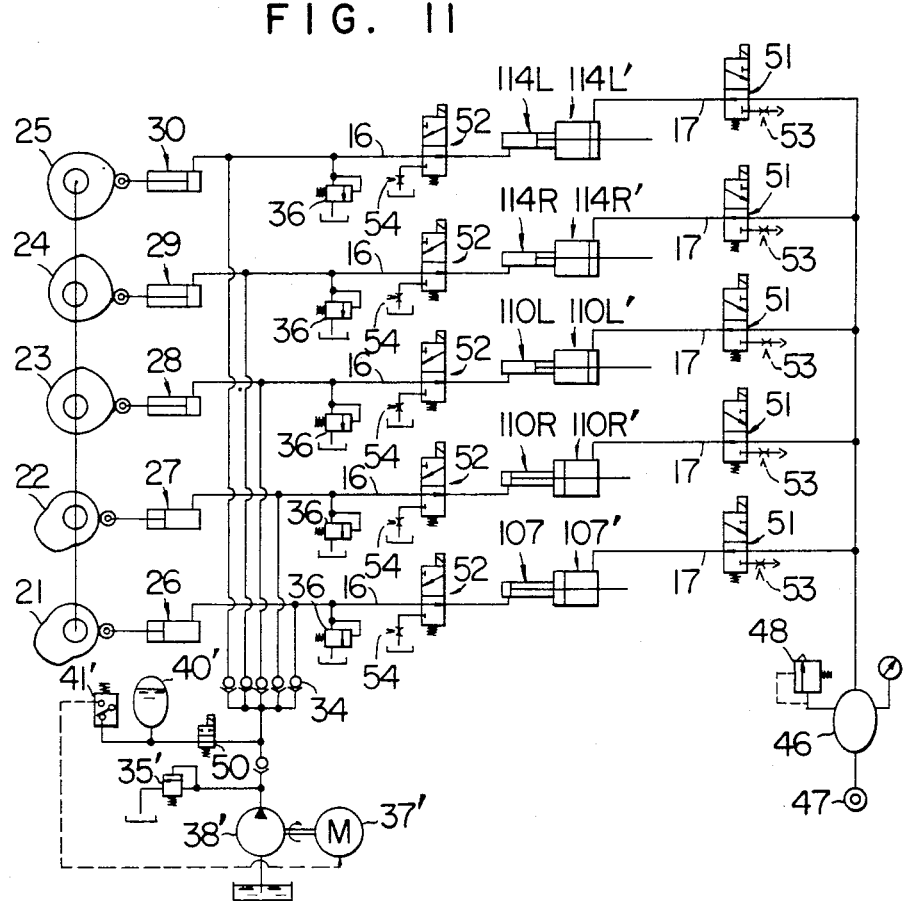
FIG. 11 is a circuit diagram of a third example of the hydraulic system.

FIG. 11 shows a third example of the hydraulic circuit which is basically identical to the second example shown in FIG. 9. This example, however, is different from the second example in that means are provided for permitting independent operation of the feed bars only in one direction.

More specifically, in this third example, a solenoid-operated shut-off valve 50 is disposed in the line connecting the hydraulic pump 38′ to the accumulator 40′. Also, each line 17 has a first solenoid-operated two-position valve 51, while each line 16 is provided with a second solenoid-operated two-position valve 52. The first solenoid-operated two-position valve 51 permits, in the de-energized state, each pneumatic cylinders 107′, 110R′, 110L′, 114R′ or 114L′ to be communicated with the air accumulator 46 through the line 17 and, in the energized state, provides a communication between each pneumatic cylinder with the atmosphere through a restrictor valve 53. On the other hand, the second two-position valve 52 permits, when de-energized, each hydraulic cylinder 107, 110R, 110L, 114R, 114L to be communicated with the hydraulic pump 38′ through the line 16 and, in the energized state, permits each hydraulic cylinder to be connected to the drain through the restrictor valve 54.

In this third example of the hydraulic circuit, the one-dimensional operation of the feed bars is effected in a manner explained hereinunder. For effecting solely the longitudinal forward and backward stroking of the feed bars 1,1, the accumulator 40′ is shut off by means of the shut-off valve 50 by the instruction from the control panel (not shown), while stopping the cam shaft 31 and operating the hydraulic pump 38′. Then, the first two-position valve 51 annexed to the advance cylinder 107 is energized to bring the pneumatic cylinder 107′ into communication with the atmosphere, while the pressurized oil from the hydraulic pump 38′ is introduced into the hydraulic cylinder 107 through the non-return valve 34, the line 16 and the second two-position valve 52, so that the advance cylinder 107 extends its piston rod to move the feed bars 1,1 forwardly. Meanwhile, the air in the associated pneumatic cylinder 107′ is discharged to the atmosphere through the resistrictor valve 53. The speed of the forward movement of the feed bars 1,1, therefore, is adjustable by means of the restrictor valve 53. Then, the second two-position valve 52 is energized by the instruction given through the control panel, while deenergizing the first two-way valve 51, so that the hydraulic cylinder 107 is brought into communication with the drain while the pneumatic cylinder 107′ is brought into communication with the air accumulator 46, so that the hydraulic cylinder 107 performs its backward stroke to reset the feed bars, 1,1 to the starting positions. In this operation, the working oil in the hydraulic cylinder 107 is discharged to the drain through the restrictor valve 54. Thus, the speed of backward movement of the feed bars 1,1 can be adjusted by means of the restrictor valve 54.

Then, as the instruction from the control panel is dismissed, the shut-off valve 50 and the first and second two-position valves 51, 52 are de-energized to make the hydraulic circuit as a whole ready for the normal operation for sequentially transferring pieces of blank successively. The one-dimensional operation for moving the feed bars 1,1 up and down and the one-dimensional operation for clamping and unclamping are conducted by effecting a similar control of the first and second two-position valves 51, 52 associated with the lift cylinders 110R, 110L and the clamp cylinders 114R, 114L. These one-dimensional operations afford various works requiring unidirectional movement of the feed bars such as test feed of feed bars, position adjustment in relation to the molds, re-adjustment after a recovery from a trouble and so forth.

It is to be noted here that the described examples are not exclusive and various changes and modifications may be imparted thereto.

In some of the described examples, an independent make-up circuit is used for making up for the shortage of oil, while, in other examples, the make-up oil is derived through a pressure reduction valve from a hydraulic pump which is provided for generating high pressure for effecting the backward stroking of the hydraulic cylinders. These oil make-up systems can be replaced with each other without changing the major parts of the hydraulic circuits. Also, it is a matter of design choice whether an independent relief valve 36 is provided in each of the lines 16, as shown in FIGS. 7 and 11 or a common relief valve 36 is used for all of the lines 16, as shown in FIGS. 4 and 6. It will be clear to those skilled in the art that various modifications are obtainable by suitably exchanging the constructions of every sections between different examples of the hydraulic circuits heretofore described.

What is claimed is:

1. A transfer mechanism comprising:
a pair of substantially parallel feed bars,
at least one pair of opposed jaws each jaw being mounted on a corresponding one of said feed bars,
means for supporting said bars for movement in three directions, each direction of movement being substantially perpendicular to the other two directions of movement,
three separate drive means operable to effect cyclic movement of said bars in said three directions, wherein each said drive means comprises at least one hydraulic cylinder having a piston operable to move said bars in one of said directions and at least one cam-operated hydraulic piston pump hydraulically directly connected to said cylinder such that the piston of said cylinder reciprocates in synchronism with the reciprocation of the piston of said cam-operated pump, and means for driving the cams of said pumps in timed relation to operate said pumps in a predetermined sequence.

2. A transfer mechanism as set forth in claim 1, further comprising a relief valve connected between each said cylinder and each said pump.

3. A transfer mechanism as set forth in claim 1 or 2, further comprising a source of hydraulic liquid under a lower pressure communicating with each said pump through a non-return valve.

4. A transfer mechanism as set forth in claim 1, wherein each said cylinder consists of a double-acting cylinder having one working chamber communicating with said cam-operated pump and the other chamber selectively communicating with a second hydraulic pump or a drain in timed relation with operation of said associated cam-operated hydraulic pump.

5. A transfer mechanism as set forth in claim 4, further comprising a restrictor connected to to said drain.

6. A transfer mechanism as set forth in claim 4 or 5, further comprising a third hydraulic pump communicating with each said cam-operated pump through a non-return valve and a relief valve connected between said third pump and said non-return valve to maintain the hydraulic liquid delivered from said third pump at a lower pressure.

7. A transfer mechanism as set forth in claim 4 or 5, wherein said second hydraulic pump communicates with each said cam-operated pump through a pressure reduction valve and a non-return valve.

8. A transfer mechanism as set forth in claim 1, wherein each said cylinder consists of a single-acting cylinder having a piston operatively connected to a piston of a single-acting pneumatic cylinder having a working chamber communicating with an accumulator for accumulating air at a predetermined pressure.

9. A transfer mechanism as set forth in claim 8, further comprising a second accumulator for accumulating hydraulic liquid at a predetermined lower pressure, said second accumulator communicating with each said cam-operated pump through a non-return valve.

10. A transfer mechanism as set forth in claim 9, further comprising a first two-position valve having first, second and third ports communicating with said penumatic cylinder, said air accumulator and an air vent, respectively, and taking a first position in which communication is established between said first port and said second port and a second position in which communication is established between said first and third ports, and a second two-position valve having first, second and third ports communicating with said hydraulic cylinder, said cam-operated hydraulic pump and a drain, respectively, and taking a first position in which communication is established between said first and second ports and a second position in which communication is established between said first and third ports.

11. A transfer mechanism as set forth in claim 10, further comprising a first and second restrictors connected between the third port of said first two-position valve and said air vent and between the third port of said second two-position valve and said drain, respectively.

12. A transfer mechanism as set forth in claim 1, wherein each said cylinder consists of a single-acting cylinder having a piston operatively connected to the piston of a single-acting pneumatic cylinder having a working chamber tightly closed to confine air therein.

13. A transfer mechanism as set forth in claim 1, wherein said cylinder consists of a single-acting cylinder having a spring for effecting the return stroke of the cylinder.

* * * * *